(12) United States Patent
Moffitt et al.

(10) Patent No.: US 11,203,145 B2
(45) Date of Patent: Dec. 21, 2021

(54) PHOTOELASTIC CHARACTERIZATION OF RESIDUAL STRESSES AND STRESS DISTRIBUTIONS IN INJECTION MOLDED PREFORMS AND STRETCH BLOW-MOLDED BOTTLE

(71) Applicant: The Coca-Cola Company, Atlanta, GA (US)

(72) Inventors: Ronald D. Moffitt, Spartanburg, SC (US); Yu Shi, Marietta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 294 days.

(21) Appl. No.: 15/771,450

(22) PCT Filed: Oct. 28, 2016

(86) PCT No.: PCT/US2016/059393
§ 371 (c)(1),
(2) Date: Apr. 27, 2018

(87) PCT Pub. No.: WO2017/075403
PCT Pub. Date: May 4, 2017

(65) Prior Publication Data
US 2018/0311883 A1 Nov. 1, 2018

Related U.S. Application Data

(60) Provisional application No. 62/247,834, filed on Oct. 29, 2015.

(51) Int. Cl.
*B29C 49/78* (2006.01)
*B29C 49/06* (2006.01)
(Continued)

(52) U.S. Cl.
CPC .............. *B29C 49/78* (2013.01); *B29C 45/76* (2013.01); *B29C 49/06* (2013.01); *B29C 49/10* (2013.01);
(Continued)

(58) Field of Classification Search
CPC ......... B29C 49/78; B29C 49/10; B29C 49/12; B29C 49/6409; B29C 49/06; B29C 45/76;
(Continued)

(56) References Cited

U.S. PATENT DOCUMENTS 3,870,181 A * 3/1975 Sincock .................. B29C 49/12
215/373
4,036,927 A   7/1977 Stolki
(Continued)

FOREIGN PATENT DOCUMENTS

EP    3157731 A1    4/2017
JP   2002113770 A   4/2002
(Continued)

OTHER PUBLICATIONS

Ramji, M., and R. G. R. Prasath. "Sensitivity of isoclinic data using various phase shifting techniques in digital photoelasticity towards generalized error sources." Optics and Lasers in Engineering 49.9-10 (2011): 1153-1167. (Year: 2011).*
(Continued)

*Primary Examiner* — Galen H Hauth
(74) *Attorney, Agent, or Firm* — Eversheds Sutherland (US) LLP

(57) ABSTRACT

This disclosure provides new methods to characterize and relate residual stress and orientation imparted to the injection molded polymeric preform with orientation and residual stress in the resulting blow molded bottle. The method developed allows one to define and map the coupled thermal stress histories of both processes to define applicable pre-
(Continued)

ferred mutual processing windows for both preform and bottle molding processes. Stretch blow-molding parameters are developed using the disclosed method.

17 Claims, 3 Drawing Sheets

(51) Int. Cl.
- *B29C 45/76* (2006.01)
- *B29C 49/12* (2006.01)
- *B29C 49/64* (2006.01)
- *B29C 49/10* (2006.01)
- *B29K 67/00* (2006.01)
- *B29B 11/08* (2006.01)
- *B29L 31/00* (2006.01)

(52) U.S. Cl.
CPC .......... *B29C 49/12* (2013.01); *B29C 49/6409* (2013.01); *B29B 11/08* (2013.01); *B29K 2067/003* (2013.01); *B29K 2995/0018* (2013.01); *B29K 2995/0032* (2013.01); *B29K 2995/0034* (2013.01); *B29L 2031/7158* (2013.01)

(58) Field of Classification Search
CPC ...... B29K 2067/003; B29K 2995/0034; B29K 2995/0018; B29K 2995/0032; B29B 11/08; B29L 2031/7158
See application file for complete search history.

(56) References Cited

U.S. PATENT DOCUMENTS

| | | | | |
|---|---|---|---|---|
| 4,054,629 A | * | 10/1977 | Wang | B29C 45/73 264/520 |
| 5,217,128 A | * | 6/1993 | Stenger | B29C 49/12 215/10 |
| 5,614,148 A | * | 3/1997 | Beck | B29C 49/0073 215/375 |
| 8,158,052 B2 | | 4/2012 | Richards et al. | |
| 2006/0074614 A1 | * | 4/2006 | Chang | B29C 49/42 703/6 |
| 2007/0186674 A1 | | 8/2007 | Hyodo et al. | |
| 2009/0239012 A1 | | 9/2009 | Thomasset et al. | |
| 2011/0042338 A1 | | 2/2011 | Pecorini et al. | |
| 2014/0336349 A1 | | 11/2014 | Sipos et al. | |
| 2015/0110983 A1 | | 4/2015 | Kriegel et al. | |
| 2015/0141584 A1 | * | 5/2015 | Saywell | C08G 63/181 525/444 |
| 2017/0129157 A1 | | 5/2017 | Derrien et al. | |

FOREIGN PATENT DOCUMENTS

| | | |
|---|---|---|
| JP | 2009085597 A | 4/2009 |
| JP | 2009092401 A | 4/2009 |

OTHER PUBLICATIONS

Bandla, Sudheer, Masoud Allahkarami, and Jay C. Hanan. "Out-of-plane orientation and crystallinity of biaxially stretched polyethylene terephthalate." Powder Diffraction 29.2 (2014): 123-126. (Year: 2014).*

Hanan, Jay C. "Birefrengent residual stress and improved injection mold design." Materials Science Forum. vol. 768. Trans Tech Publications Ltd, 2014. (Year: 2014).*

International Preliminary Report on Patentability for PCT/US2016/059393, dated May 11, 2018 (9 pages).

Extended European Search Report of Application No. 16860911.3 dated Apr. 10, 2019.

International Search Report and Written Opinion for PCT/US2016/059393 dated Jan. 13, 2017.

* cited by examiner

PHOTOELASTIC CHARACTERIZATION OF RESIDUAL STRESSES AND STRESS DISTRIBUTIONS IN INJECTION MOLDED PREFORMS AND STRETCH BLOW-MOLDED BOTTLE

CROSS REFERENCE TO RELATED APPLICATIONS

This application claims the benefit of U.S. Provisional Application No. 62/247,834, which was filed on Oct. 29, 2015, which is incorporated herein by reference, and is a 35 U.S.C. § 371 national stage application of PCT Patent Application No. PCT/US2016/059393, filed Oct. 28, 2016, which is also incorporated by reference.

TECHNICAL FIELD

This disclosure relates to methods small and light-weight beverage packaging suitable for use with carbonated beverages and having good gas barrier properties.

BACKGROUND

Polyethylene terephthalate ("PET") polymers and co-polymers are widely used to manufacture bottles for beverages such as water, juices, carbonated soft drinks (CSD), and the like, because they generally possess good mechanical and gas barrier properties. Such bottles are conventionally prepared using a stretch blow molding process. Stretch blow molding first involves injecting the PET polymer or co-polymer resin into a preform injection mold designed according to the desired final bottle shape and size and the polymer properties. The preform is subsequently reheated and stretch blow-molded in which the heated preform is both blown and stretched into the final container shape using compressed air and an axial stretching rod.

Injection molded polymer preforms and their corresponding reheat stretch blow-molded bottles share a complex, coupled thermal stress history. That history begins with melting and extrusion, and it ends with the solid state inflation and cooling of the reheated preform. While numerical simulations can be employed to help understand the complicated interaction in this process sequence, the effects of residual stresses molded into the preform on the reheat stretch blow molding dynamics are generally not well understood. As a result, the level of understanding of residual stresses molded into a preform is inadequate to make quantitative numerical predictions regarding the expected stress distribution in the blown bottle.

What are needed are better methods and processes by which the residual stresses that are molded into a preform can be analyzed and that information applied to the reheat stretch blow molding parameters to reduce the expected stress distribution in the blown bottle. What are also needed are better, practical analytical methods to analyze those preform residual stresses.

SUMMARY OF THE INVENTION

Among other things, the present disclosure provides for new and improved methods by which the residual stresses that are molded into a preform can be analyzed and methods by which data from such measurements can be employed to reduce or minimize the expected stress distribution in the blown bottle. In an aspect, photoelastic measurements on the preform and/or the bottle can be used to reveal the sequential complex evolution of the molded-in residual stress states in each molded part. Such data on the preform and/or the bottle subsequently can be used to adjust the injection molding and stretch blow-molding parameters to achieve reduced stress distributions in the final blown bottle.

The methods of this disclosure were developed and found useful for polyethylene terephthalate (PET) polymers and co-polymers, but also were found useful for poly(ethylene furan-2,5-dicarboxylate) (also termed poly(ethylene-2,5-furandicarboxylate) or "PEF"-based polymers and co-polymers. Compared to standard commercial grade PET bottle resins, PEF copolyesters possess lower crystallinity, crystallize at a significantly slower rates, and are entangled to a lesser extent. These differences present significant processing challenges to be overcome in the design and injection molding of preforms and in the stretch blow molding processing of molded preforms for the production of commercially viable PEF bottles. Since PEF does not process similarly to PET because of the inherently different mechanical properties for these two resin systems, new axial and hoop stretch ratios should be defined for preform designs that yield stretch blow molded bottles of acceptable quality and performance. As a result, the present disclosure is particularly useful in developing new PEF copolyester axial and hoop stretch ratios.

In an aspect, this disclosure provides an improved method for measurement, and further provides guidelines for utilizing a photoelastic characterization method to specify improved operating conditions for both preform and bottle production processes. Such information yields bottles with improved processing behavior and enhanced physical performance.

In a further aspect, there is provided a method of fabricating a polymer container having reduced residual stress, the method comprising:

a) providing a preform for a polymer container;

b) measuring the photoelasticity (stress-induced birefringence) of at least one selected section of the preform using circularly polarized light to determine residual stress patterns in the preform;

c) using the residual stress patterns in the preform to determine an axial stretch ratio and a hoop stretch ratio for stretch blow-molding the preform which reduce residual stress in the polymer container; and d) stretch blow-molding the preform to form the polymer container using the determined axial stretch ratio and a hoop stretch ratio.

In a further aspect, an interactive method can be used in which the method of fabricating a polymer container as set out immediately above can further comprise:

e) measuring the photoelasticity (stress-induced birefringence) of at least one selected section of the polymer container using circularly polarized light to determine residual stress patterns in the polymer container; and f) using the residual stress patterns in the polymer container to adjust preform dimensions for a size-adjusted perform, further reducing residual stress in the size-adjusted perform compared to the preform of step a); and g) repeating steps a)-d) to form an improved polymer container which further reduces residual stress in the improved polymer container compared to the polymer container of step d).

According to an aspect, the photoelasticity measurement can comprise a polariscopic method based upon a ten-step phase shift to determine residual stress patterns. The residual stress patterns include principal stress differences (isochromatics) and principal stress directions (isoclinics).

This disclosure further provides for a polymer container fabricated according to the methods set out herein, including a polymer container having any one of more of the following properties: a shelf life of greater than about 25 weeks (at 22° C.); a volumetric creep strain of less than about 10%; and/or a container size less than about 20 oz.

Other aspects and embodiments of this disclosure include a polymer container or bottle that is fabricated according to the method described herein. In one aspect, the can comprise a polyethylene terephthalate (PET) polymer or co-polymer, or a poly(ethylene-2,5-furandicarboxylate) (PEF) polymer or co-polymer. A further aspects provides for a container that can have any one or more of the following properties:

a shelf life of greater than about 25 weeks (at 22° C.);
    a volumetric creep strain of less than about 10%; and/or
    a container size less than about 20 oz.

In this aspect, the lower limit of container size is consistent with the smallest polyethylene terephthalate bottles for beverages such as water, juices, carbonated soft drinks (CSD), such as for example, 200 mL, 250 mL, 300 mL and the like. According to a further aspect, the container can have any one or more of the following properties:

a shelf life of greater than about 25 weeks (at 22° C.);
    a volumetric creep strain of less than about 10%; and/or
    a container size from about 20 oz. up to about 5 liters (L).

These and other aspects and embodiments of this disclosure are further described in the drawings and the detailed description herein.

DETAILED DESCRIPTION OF THE INVENTION

Figure 1:
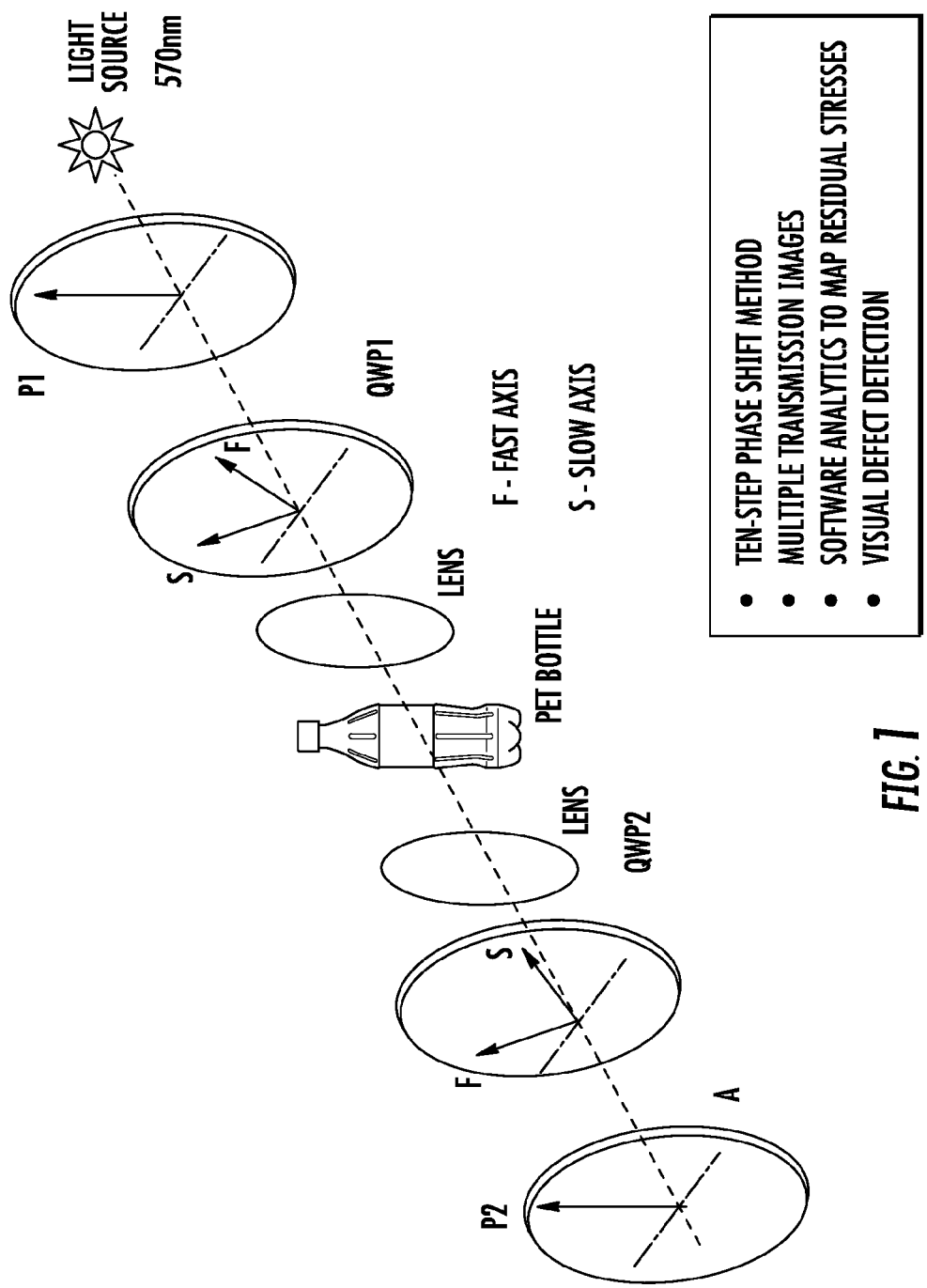
FIG. 1 illustrates the polariscopic method used to evaluate the preforms and bottles according to this disclosure, representing a ten-step phase shift method and multiple transmission images, followed by mapping the residual stresses for visual defect detection.

Aspects of this disclosure provide for new and improved methods by which the residual stresses that are molded into a preform can be analyzed and the data from such measurements used to reduce or minimize the expected stress distribution in the blown bottle. Specifically, photoelastic measurements are employed to examine the preform and/or the bottle can be used to reveal the evolution of the molded-in residual stress.

Generally, excessive residual stresses in a preform can manifest as severe shrinkage and distortion of the preform in the infrared heating oven in the reheat stretch blow molding process. Based upon this observation, and not being limited to any particular theory, it was thought that to some extent, residual stresses in the preform may couple with and potentially limit directional extensibility under the imposed stresses in the reheat stretch blow molding process. It was thought that this coupling process, along with the stretch blow molding processing conditions may ultimately define the magnitude and distribution residual stresses in the final bottle. The analytical methodology disclosed herein may be used to analyze and define the relationship between residual stresses in the preform and bottle, and provide a method by which such measurements can be used to reduce or minimize the expected stress distribution in the blown bottle.

According to an aspect, this disclosure provides methods that utilize circularly polarized light to probe birefringent, in-plane residual stress patterns in transparent molded articles. A description of the general method and additional information for how circularly polarized light can be used to visualize birefringence and residual stress patterns are found in the following references (numbered R1-R5), each of which is incorporated herein by reference in their entireties: (R1) R. G. R. Prasath, K. Skenes, and S. Danyluk, "Comparison of Phase Shifting Techniques for Measuring In-Plane Residual Stress in Thin, Flat Silicon Wafers", J. Elec. Mat., 42(8), 2478-2484 (2013); (R2) K. Skenes, R. G. R. Prasath, and S. Danyluk, "Chapter 10: Polariscopy Measurement of Residual Stress in Thin Silicon Wafers", in Marco Rossi, Marco Sasso, Nathanael Connesson, Raman Singh, Adrian DeWald, David Backman, Paul Gloeckner, Residual Stress Thermomechanics & Infrared Imaging, Hybrid Techniques and Inverse Problems, Volume 8, Conference Proceedings of the Society for Experimental Mechanics Series, The Society for Experimental Mechanics, p. 79-85 (2014); (R3) S. He T. Zheng, and S. Danyluk, "Analysis and Determination of Stress Optic Coefficents of Thin Single Silicon Samples", J. Appl. Phys., 96(6), 3103-3109 (2004); (R4) U.S. Pat. No. 4,036,927, entitled "Preparation of Molecularly Oriented Containers Using Reheat Process;" and (R5) D. C. Drucker, Photoelastic Separation of Principal Stresses by Oblique Incidence", J. Appl. Mech., A-156-A-160 (September 1943).

The theory for conducting such photoelastic measurements on thin, flat, transparent substrates has been described, for example, in the incorporated references R1-R3 cited immediately above. However, such methodology has been limited to flat surfaces and substrates. The present inventors realized that using a variation of such photoelastic measurements, this methodology could be adapted and applied to preforms and bottles having curved surfaces, which was heretofore not thought possible or effective. In one aspect, for example, this disclosure provides a method to view the isochromatics of a preform and bottle. That is, the contours of the constant in-plane stress differences (isochromatics) can be visualized as disclosed here in to assess any predominate deformation mode (uniaxial or biaxial) within the neck, sidewall body, and the base of the preform and bottle.

In the further and more quantitative aspect of this disclosure, it was discovered that Maxwell's stress optic law can be used along with the shear stress difference method to calculate in-plane principal stress differences, and separate principal stresses using the measured isoclinics (contours of constant stress direction), respectively. This information, in turn, can be used to refine the structure and design of the proform, of the bottle, and of the stretch blow-molding process.

As described herein, the photoelasticity measurement can determine residual stress patterns, and the residual stress patterns include principal stress differences (isochromatics) and principal stress directions (isoclinics). As used herein, the term "isoclininc" is used to define the locus of points along which the principal stresses maintain the same direction. The term "isochromatic" defines the locus of points along which the first and second principal stress differences in the specimen maintain constant values; or alternatively, isochromatic also constitutes the locus of points in which the shear stress magnitude is maximum. Under crossed polarizers, isoclinics and isochromatics are superimposed. Using various angular arrangements of the polarizer, quarter wave plates, and analyzer in the circular polariscope, photoelastic information may be gleaned from the specimen that facilitates the separation of the in-plane principal stresses. Examples of whole-field principle stress separation techniques that have been employed in the image analyses of flat specimen geometries include photoelastic separation of principal stresses by oblique incidence [Drucker, *J. Appl. Mech.*, A156-A160 (1962)], phase-stepping interferometric photoelastic methods for plane stress separation as outlined [Lei et al., *Optic and Lasers in Engineering*, 45, 77-82 (2007)], complimentary phase shifting [Zhang et al., *Optic and Lasers in Engineering*, 45, 860-867 (2007)], and the ten-step method [Rossi et al., *Residual Stress, Thermomechanics & Infrared Imaging, Hybrid Techniques and Inverse Problems, Volume 8: Proceedings of the* 2013 *Annual Conference on Experimental and Applied Mechanics*, Springer Science and Business Media, Aug. 27, 2013; and Skenes et al., in Rossi et al., Chapter 10: *Polariscopy Measurement of Residual Stress in Thin Silicon Wafers*].

For example, among other things, this disclosure provides for utilizing circularly polarized light to probe birefringent in-plane residual stress patterns in transparent molded articles, using the methodology described in References R1, R2, and R3, which are incorporated herein by reference.

Accordingly, in an aspect there is provided a method of fabricating a polymer container having reduced residual stress, the method comprising:
 a) providing a preform for a polymer container;
 b) measuring the photoelasticity (stress-induced birefringence) of at least one selected section of the preform using circularly polarized light to determine residual stress patterns in the preform;
 c) using the residual stress patterns in the preform to determine an axial stretch ratio and a hoop stretch ratio for stretch blow-molding the preform which reduce residual stress in the polymer container; and
 d) stretch blow-molding the preform to form the polymer container using the determined axial stretch ratio and a hoop stretch ratio.

In a further aspect, an interactive method can be used in which the method of fabricating a polymer container as set out immediately above can further comprise:
 e) measuring the photoelasticity (stress-induced birefringence) of at least one selected section of the polymer container using circularly polarized light to determine residual stress patterns in the polymer container; and
 f) using the residual stress patterns in the polymer container to adjust preform dimensions for a size-adjusted preform, further reducing residual stress in the size-adjusted preform compared to the preform of step a); and
 g) repeating steps a)-d) to form an improved polymer container which further reduces residual stress in the improved polymer container compared to the polymer container of step d). The disclosure also provides a polymer container fabricated according to any one of the disclosed methods.

Relevant to the method of fabricating a polymer container disclosed herein, the photoelasticity measurement can comprise a circular polarizer and a specimen with a curved surface polariscopic method based upon a ten-step phase shift can be used to determine residual stress patterns. Generally, the photoelasticity measurement can comprise a curved surface, wherein the surface curvature to the specimen thickness ratio is greater than about 3. In other aspects the method of fabricating the polymer container can be applicable to containers having a thickness of less than or about 0.50 inches thick. Alternatively, the method of fabricating the polymer is useful for containers having a container side-wall thickness is less than or about 0.25 inches.

Generally, the photoelastic principal stress separation techniques, including but not limited to those disclosed herein, may be used in the residual stress analysis of injection or compression molded preforms, as well as stretch blow molded bottles. These different analysis methods may be employed to study residual stress patterns in bottles and preforms having a curved, elliptical, circular geometry without loss of generality if the analysis is considered valid only over the range where the curvature of the specimen (which is characteristic of thickness; curvature ratio; and haze) is substantially greater than the thickness of the specimen. For the purposes of this application, the ratio of the local surface curvature to specimen thickness at the point of measurement is generally taken to be 3 or greater.

In one aspect, the specific experimental procedure utilized and described herein employs a polariscopic method based upon a ten-step phase shift method, multiple transmission images, and software analytics to map residual stresses. The method can also be used to detect visual defects in the molded parts by exploring aberrations in the residual stress field surrounding contaminating particles or voids. The ten-point method has been found to reduce noise in isoclinic data due to wave-plate mismatch error and algorithm sensitivity to near-zero retardation (low orientation). The first four arrangements of the ten-point method remove quarter-wave plates from the isoclinic calculation and reduce sensitivity to low retardation measurements. This feature can be especially beneficial in the analysis of preforms and bottles where the degrees of molecular orientation are relatively low.

As a result of this work and invention, the information gleaned from photoelastic measurements on preforms and bottles have been employed to make process adjustments to mold temperatures and cycle times to reduce the fringe order of in-plane residual stresses in molded parts, especially injection molded preforms and reheat stretch blow molded bottles. Surprisingly, it has been found that for the injection molding of PEF preforms, a fringe order N of two or less provides enhanced subsequent reheat stretch blow molding performance. While not bound by theory, the enhanced subsequent reheat stretch blow molding performance is thought to result from reducing post infrared oven longitudinal shrinkage in the preform.

Additionally, it has also been found that the disclosed method can provide discriminating evidence of the changes in the mode of deformation occurring within the bottle as a function of preform design. Coupled with preform freeblow experiments, the additional information from this polaroscopic technique can be useful for assessing the impact of preform residual stresses on bottle stretch blow molding dynamics.

Qualitative In-Plane Principal Residual Stress Analysis (Preforms and Bottles)

Dark and light field isochromatic images of residual stress fringe patterns may be employed to assess qualitative information regarding the deformation modes and history for the molded part. Isochromatic stress fringe patterns resulting in the preform from the injection molding process or in the bottle from the composite interaction of pre-orientation and thermal shrinkage in the preform and from the reheat stretch blow molding process in the bottle may be observed in the dark field by maintaining polarizer and analyzer crossed or parallel, and the input and output quarter wave plates crossed or parallel, respectively.

Observation in the light field may be accomplished by maintaining the polarizer and analyzer either crossed or parallel, and the input and output quarter wave plates either parallel or crossed, respectively. Generally, the preferred optical arrangement in each case is crossed/crossed for dark field observation, and parallel/crossed for light field viewing.

For the general assessment of injection and stretch blow molding process conditions, qualitative analyses can be useful. In performing these analyses, the preform or bottle are each separated into three primary regions: the end cap or base; the main sidewall body; and the transition or neck. The particular part section is then inserted between the input and output quarter wave plates. The preform or bottle may be used intact, as this is a non-contact, non-destructive method, or a sample may be cut from the preform or bottle for measurement, as the particular need or desire warrants. Photoelastic images and measurements are performed normal to the bottle surface, and captured photographically or digitally.

Several examples of qualitative isochromatic analyses of PET and PEF bottles and preforms were analyzed using the polariscopic method described herein, the results of which are set out in the Examples section. For example, four-point bending tests were conducted using PET and PEF films to derive calibrated values for the stress-optic coefficients for these two polymer systems. For PET, the stress optic coefficient was discovered to be $2.01 \times 10^{-10}$/Pa, whereas for PEF the measured stress optic coefficient was $1.93 \times 10^{-10}$/Pa. The stress-optic coefficient value for PEF was extrapolated back to an equibiaxial stretch ratio of $1.00 \times 1.00$ from measurements on equibiaxially stretched films stretch to $2.00 \times 2.00$ and $3.00 \times 3.00$, as illustrated in the data in the Examples.

In an aspect, this disclosure also provides methods for the analysis of fringe order in the preforms and the identification of the isotropic point (at which both in-plane principal stresses are equal). The effect of fringe order reduction that can be realized by subjecting injection molded preforms to high temperature thermal conditioning, such as achievable by boiling the preforms in water, are also summarized in the Examples section. While the preform molds that were used to fabricate PET and PEF preforms were the same, the data indicate that fringe order varied along the preform longitudinal axis in the PET preforms, whereas the fringe order was substantially uniform along the body in the PEF preforms. In both PET and PEF preforms, soaking the preforms in boiling water reduced the fringe order from about 3.5 to about 0.5 or lower.

Referring again to the Examples, for bottles fabricated from these preforms, deformation modes in the neck, body sidewall, and base were measured using the described polarographic method. For the PET bottles reheat stretch blow molded from the preforms, stretching was predominately biaxial in the neck, and uniaxial in the body sidewall and base for the 10 and 12 oz straightwall bottles produced. When the same preform was used to stretch blow mold larger 16 oz straightwall bottles for the two resin systems, the neck and base maintained the same stretching modes of biaxial and axial, respectively, but the body sidewall transitioned to predominately hoop stretch. This result is surprising in that the described method provides descriptive insight into the hidden dynamics of the blow molding operation within the mold. These results are summarized in Table 2 in the Examples.

Figure 2:
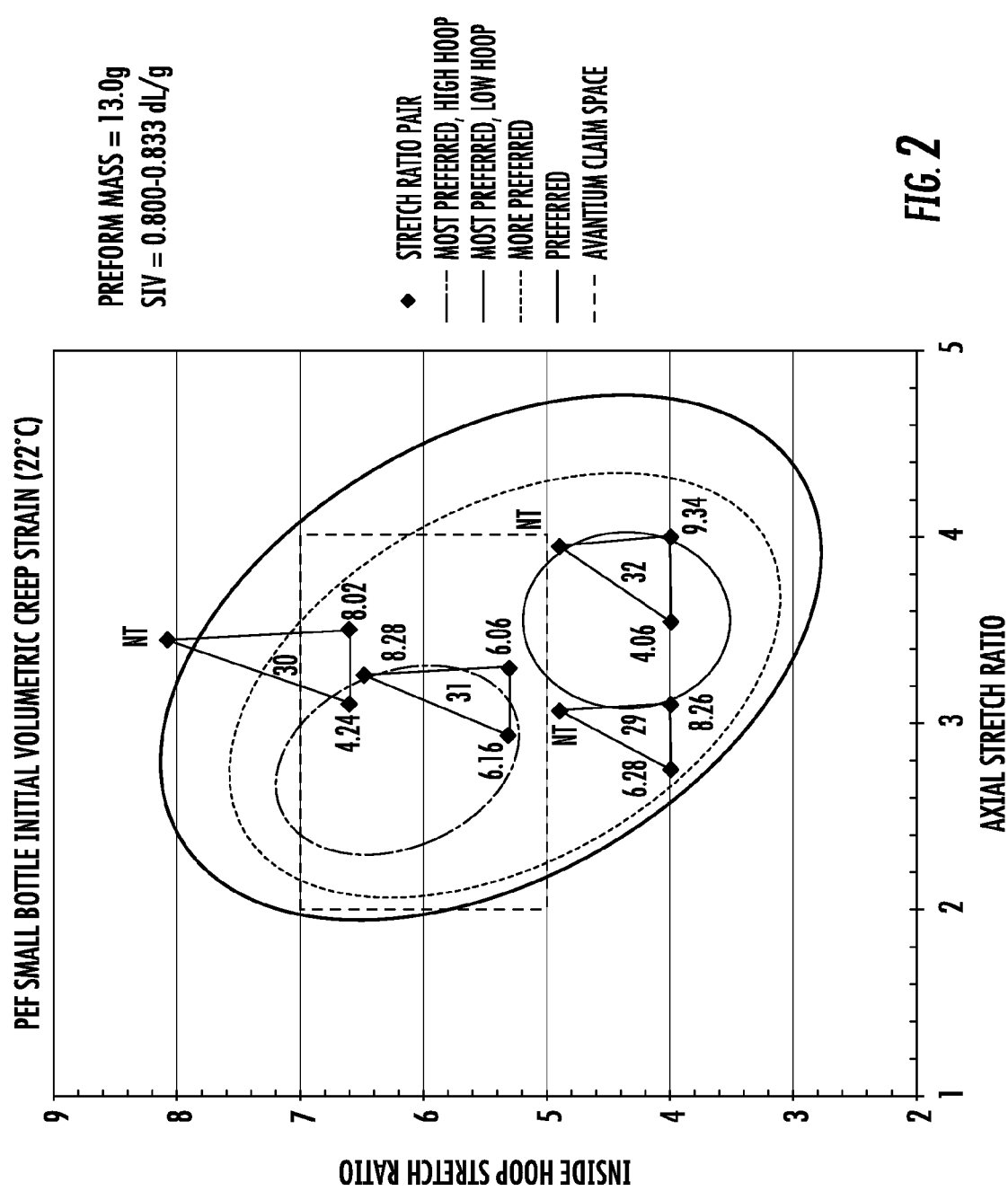
FIG. 2 provides a graphic illustration of PEF small bottle (13.0 g) initial volumetric creep strain (22° C.) tabulated on the plot itself, corresponding to highly successful combinations of inside hoop ratios and axial stretch ratios for PEF small bottles, developed using the methodology of this disclosure. The innermost ellipses correspond to more preferred high hoop (red) and low hoop (orange) embodiments. The lowest volumetric creep and the highest FTIR shelf life at 22° C. was derived for PEF using the equibiaxial preform design with a 4.00×4.00=16.0 (axial stretch ratio×hoop stretch ratio=areal stretch ratio) and the 10 oz. bottle mold. Reference is made to U.S. Patent Appl. Publ. No. 2014/0336349 A1 (Furanix Technologies, B. V.), which is incorporated herein by reference as pertinent part, for the description of what is termed the Avantium preform design specifications of "space" as illustrated in this figure, for example, at para. [0050].
Figure 3:
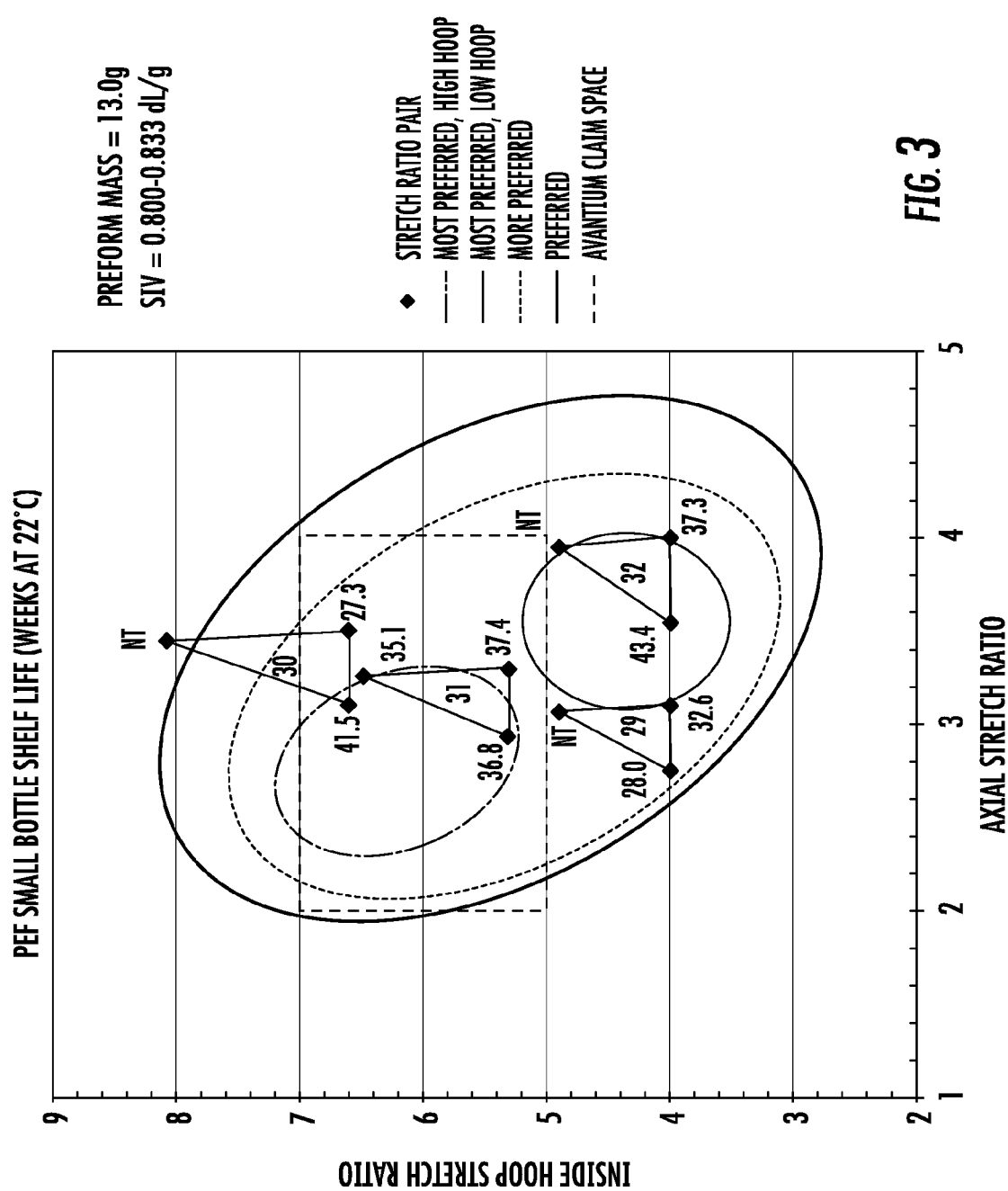
FIG. 3 illustrates the PEF small bottle (13.0 g) shelf life (weeks at 22° C., determined by FTIR) tabulated on the plot itself, corresponding to highly successful combinations of inside hoop ratios and axial stretch ratios for PEF small bottles, using the methodology of this disclosure. The innermost ellipses correspond to more preferred high hoop (red) and low hoop (orange) embodiments. The highest FTIR shelf life at 22° C. was derived for PEF using the equibiaxial preform design with a 4.00×4.00=16.0 (axial stretch ratio×hoop stretch ratio=areal stretch ratio) and the 10 oz. bottle mold, corresponding to the lowest volumetric creep as illustrated in FIG. 2.

Reference is made to FIG. 2 and FIG. 3. These figures set out experimental designs for preforms according to this disclosure, showing elliptical distributions for various stretch ratios or stretch ratio domains. We refer to these as Stretch Ratio Domain 1 (also termed preferred), Stretch Ratio Domain 2 (also termed more preferred), and bifurcated stretch ratio regimes for low axial, high hoop stretch ratio and high axial, low hoop stretch ratio preform designs. These latter two domains are referred to herein as Stretch Ratio Domain 3 (also termed most preferred, high hoop stretch) and Stretch Ratio Domain 4 (also termed most preferred, high hoop stretch). The elliptical regions shown in the plots of FIG. 3 and FIG. 4 correspond to the parameter values tabulated within this disclosure.

All of the PEF bottles regardless of size (namely, 10, 12, or 16 oz.), reheat stretch blow molded from the same preform design, exhibited similar deformation modes distributed across the neck, body sidewall and base of all bottles as did the 10 oz. PET bottle. No significant transition in deformation modes was noted for the PEF 16 oz. bottle as was for the similarly sized PET bottle. Moreover, the lowest volumetric creep and the highest FTIR shelf life at 22° C. was derived for PEF using the equibiaxial preform design with a $4.00 \times 4.00 = 16.0$ (axial stretch ratio×hoop stretch ratio=areal stretch ratio) and the 10 oz. bottle mold. These results are illustrated in FIG. 2 and FIG. 3.

Quantitative In-Plane Principal Residual Stress Analysis and Separation of Principal Stress Components The photoelastic method employed herein is based upon stress-induced birefringence. Near infrared (NIR) polariscopy utilizing a ten-step phase shifting method (see FIG. 1) for increased accuracy and sensitivity for in-plane residual stress difference from retarded light measurements was employed according to the method outlined in references R1 and R2. The specific orientations of the optical elements in the polarigraphic measurement apparatus are given in Table II of Reference R1. The first four instrument configurations correspond to plane-polariscopic measurements, whereas the latter six instrument arrangements relate to circular polarigraphic measurements.

While various optical system configurations and combinations thereof may be utilized in the analytical aspects of this disclosure, the present disclosure uses a measurement apparatus comprising a broadband light source (570 nm), polarizer and NIR (near infrared) filter, input quarter wave plate, sample holder, output quarter wave plate, analyzer, and camera. A modified Canon EOS 50D digital camera with 4,752×3,168 pixel resolution equipped with a 750 nm low-pass filter provides an adequate platform for image capture.

While not intending to be bound by theory, it is appreciated that retardation of transmitted light occurs when light passes through a transparent object with in-plane residual stresses. Relative retardation varies with the distribution of residual stresses within the particular plane of the part being analyzed. Maxwell's stress optic law (see Equation (1) in Reference R1) can be used to calculate the residual principal stress difference once the local retardation values have been measured and stress optic coefficient has been determined through an appropriate calibration procedure. As set out in the Examples section, the four-point bending method was used to determine the stress-optic coefficient using a procedure similar to and adapted from that defined in Reference R3.

While various methods available to extract in-plane principal stresses from photoelastic measurements can be used according to this disclosure, the shear difference technique is the simplest to implement and most accurate method. This method is described at Section 10.4 in Reference R2, which describes the computation and smoothing procedure to separate the individual principal stresses from the in-plane stress differences.

Particular Aspects of this Disclosed Methodology

The polarographic method presented herein provides a state-of-the-art technique for extracting in-plane isochromatic (constant stress difference contours) and isoclinic data (constant stress direction contours) using the 10-point phase shifting method with preforms and bottles having curved surfaces. While this methodology has been used to measure residual stresses in thin, flat silicon wafers, its application to the measurement of residual stresses in curved surfaces is novel and its particular application to curved surfaces such as preforms and bottles constitutes a novel approach for non-contact stress measurements in transparent polymeric preforms and bottles.

Reference is again made to the following references (R4) U.S. Pat. No. 4,036,927, entitled "Preparation of Molecularly Oriented Containers Using Reheat Process;" and (R5) D. C. Drucker, Photoelastic Separation of Principal Stresses by Oblique Incidence", J. Appl. Mech., A-156-A-160 (September 1943). Unlike the method disclosed in Drucker's paper (R5) and employed as a basis for analysis in U.S. Pat. No. 4,036,927 (R4), the preferred method described herein enables the extraction of precise and highly localized stress information from the whole stress field in the part. Therefore, despite the fact that the bottle is curved, the bottle can be rotated to maintain surface orthogonality with the optical beam. In fact, rotation of the preform or bottle is needed when characterizing the angular uniformity of stresses in the preform or bottle.

Even on a qualitative basis, the described method of the current invention allows one to identify the mode of deformation in a specific region of a stretch blow molded bottle. This method of characterization has not been described in the literature. The Drucker paper, which is used in U.S. Pat. No. 4,036,927 to provide an estimate of overall stress in the bottle, does not provide additional information relative to the deformation modes active in shaping the neck, sidewall body, or base during bottle inflation against the mold. Accordingly, these aspects provided in the present disclosure provide a distinct and previously unknown advantage in analyzing, evaluating, and improving on preforms and stretch blow-molded bottles.

Experimental Validation and Further Examples for PEF Co-Polyester Resins

In order to further examine this concept for PEF copolyester resins, four unique 13 g preforms were designed to achieve areal stretch ratios (areal stretch ratio=axial stretch ratio×hoop stretch ratio) ranging from 11 to 29 across three straight wall bottle designs, ranging in size from 10 oz. to 16 oz. The Examples set out the data for selected relevant preform and bottle dimensions, and their performance results.

Polymer bottles or containers that have been found to benefit from the methods according to this disclosure include polymer containers that can comprise a polyethylene terephthalate (PET) polymer or co-polymer, or a poly(ethylene-2,5-furandicarboxylate) (PEF) polymer or co-polymer. For example, the method is applicable to a preform and polymer container that can comprise a poly(ethylene-2,5-furandicarboxylate) (PEF) polymer or co-polymer, in which the axial stretch ratio is from about 1.9 to about 4.7 and the hoop stretch ratio is from about 2.7 to about 8.1. In an aspect, the preform and polymer container can include about 5% to about 10% by weight PEF and from about 90% to about 95% by weight PET. Generally, the preform can weighs at least about 13 grams, at least about 15 grams, at least about 17 grams, at least about 19 grams, or at least about 12 grams.

Using the methods of this disclosure, the axial stretch ratio can be from about 2.0 to about 4.3 and the hoop stretch ratio is from about 3.1 to about 7.5; alternatively, the axial stretch ratio is from about 2.3 to about 3.2 and the hoop stretch ratio is from about 5.2 to about 7.1; or alternatively, the axial stretch ratio is from about 3.0 to about 4.0 and the hoop stretch ratio can be from about 5.2 to about 3.5.

According to a further aspect, based on the methods of this disclosure, the areal stretch ratio (axial stretch ratio× hoop stretch ratio) can be from about 6 to about 33; alternatively, the areal stretch ratio can be from about 12 to about 24; or alternatively, the areal stretch ratio (axial stretch ratio×hoop stretch ratio) is from about 16 to about 21.

These and other aspects and embodiments of this disclosure are provided in the following examples and data.

EXAMPLES

Example 1. Calibration and Summary of Photoelastic Measurements on Selected Preforms and Stretch Blow-Molding Results for Bottles Several sets of PET and PEF bottles and preforms that had been manufactured under varying conditions were analyzed using a white-light digital polariscope. This information was used to first determine the stress-optic coefficients, then residual stresses were analyzed and classified in all samples. Several stress states were observed across the samples including uni-axial, bi-axial and hoop stress. Small material features were identified and cataloged in the bottles.

For the specific polymer used to fabricate the preform, a biaxially stretched sheet was made and used for calibration. Stress optic coefficient calibration was undertaken, where the stress optic coefficient for a birefringent material was calibrated by applying known stress field using a beam subjected to pure bending. The beam sample is free from stress and the small value of residual stress can be ignored. Using this method, the stress optic coefficient calibration was determined as follows:

$$\delta = \frac{|\sigma_1 - \sigma_2| 2\pi t C}{\lambda} \qquad \text{(Eqn. 3)}$$

wherein:
δ—Relative retardation
λ—Wavelength of light used
C—Relative stress optic coefficient
t—Thickness of the sample Specifically, four-point bending tests were conducted using PET and PEF films to derive calibrated values for the stress-optic coefficients for these two polymer systems. For PET, the stress optic coefficient was discovered to be $2.01 \times 10^{-10}$/Pa, whereas for PEF the measured stress optic coefficient was $1.93 \times 10^{-10}$/Pa. The stress-optic coefficient value for PEF was extrapolated back to an equibiaxial stretch ratio of 1.00×1.00 from measurements on equibiaxially stretched films stretch to 2.00×2.00 and 3.00×3.00, as illustrated in the following table. This table summarizes the test results analyzing the fringe order (N) for different preforms, which was used as a proxy for stress.

As set out in detail in the references that are incorporated herein by reference, particularly References R1-R3, the following stress optic law and fringe order calculation equations were used.

$$\delta = \frac{2\pi h}{\lambda} \ C \ (\sigma_1 - \sigma_2) = \frac{2\pi h}{\lambda} \ (n_1 - n_2) \qquad \text{(eq. 1)}$$

Retardation $$\textcircled{N} = \frac{\delta}{2\pi} = \frac{h}{\lambda} \ C \ (\sigma_1 - \sigma_2) \qquad \text{(eq. 2)}$$

proxy for stress

Fringe order N

Based on the information provided as disclosed herein, variation in stretch blow molding stretch ratios and deformation modes with preform and bottle design combinations were developed for both PEF and PET polyesters. The results are set out in the following table. In this table, note that the biaxial stretch denotes simultaneous stretching along and transverse (diametral expansion) to the bottle long axis, while axial denotes stretching along the bottle long axis, and hoop denotes stretching transverse to the bottle long axis.

TABLE 1

Summary of photoelastic measurements on selected preforms and stretch blow-molding results for bottles.

| Preform | Stress Optic Coefficient (from bi-axially stretched coupons) | Fringe Order (N) |
|---|---|---|
| A | $201 \times 10^{-12}$ Pa$^{-1}$ PET 40 mil sheet calibration | Fringe order varies along longitudinal axis; defects detected |
| B | $264 \times 10^{-12}$ Pa$^{-1}$ (PEF, equibiaxially stretched to 2 × 2) | Fringe order uniform at center, varies at neck and bottom, isotropic point identified; stresses reduced by boiling (from 3.5 as-made to 0.5 after boiling) |
| B | $335 \times 10^{-12}$ Pa$^{-1}$ (PEF, equibiaxially stretched to 2 × 2) | Uniform fringe order; reduced by boiling |

| Bottle (Preform) | Type of Stretching | Defects |
|---|---|---|
| 1-12 oz. (A) | Semi-uniform | Some |
| 2-12 oz. (A) | Non-uniform, bi-axial at neck | Few |
| 3-16 oz. (A) | Non-uniform | Many |
| 4-8.3 g/200 mL (A) | Uniform, bi-axial at neck | Few |
| 5-9.3 g/250 mL (A) | Uniform, bi-axial at neck | Few |
| 6-12 g (A) | Uniform, bi-axial at neck | Few |
| 7-17.5 g (A) | Uniform, bi-axial at neck, hoop at center | Few |
| 8-10 oz. (B) | Uniform | Few |
| 9-10 oz. (B) | Non-uniform circular | Many |
| 10-12 oz. (B) | Uniform (long. and biaxial) | None |
| 11-12 oz. (B) | Non-uniform, circular | Many |
| 12-16 oz. (B) | Uniform | Many |

TABLE 2

Variation in stretch blow molding stretch ratios and deformation modes with preform/bottle design combinations for PEF and PET polyesters.[A]

| Polymer | Preform Design | Straight-Wall Bottle Volume (oz) | Stretch Ratios (Axial × Hoop = Areal) | Preform Maximum Fringe Order | Stretch Blow Molding Deformation Mode | | |
|---|---|---|---|---|---|---|---|
| | | | | | Neck | Body Sidewall | Base |
| PEF | Conventional | 10 | 2.75 × 4.00 = 11.0 | 4-5 | Biaxial | Axial | Axial |
| | | 12 | 3.10 × 4.00 = 12.4 | 4-5 | Biaxial | Axial | Axial |
| | | 16 | 3.06 × 4.89 = 15.0 | 4-5 | Biaxial | Axial | Axial |
| | Equibiaxial | 10 | 3.55 × 4.00 = 14.2 | 3-4 | Biaxial/Hoop | Hoop | Axial/Hoop |
| | | 12 | 4.00 × 4.00 = 16.0 | 3-4 | Biaxial/Hoop | Hoop | Biaxial |
| | | 16 | 3.95 × 4.89 = 19.3 | 3-4 | Biaxial/Hoop | Hoop | Axial |
| PET | Conventional | 10 | 2.75 × 4.00 = 11.0 | 2 | Biaxial | Axial | Axial |
| | | 12 | 3.10 × 4.00 = 12.4 | 2 | Biaxial | Axial | Axial |
| | | 16 | 3.06 × 4.89 = 15.0 | 2 | Biaxial | Hoop | Axial |

[A][Biaxial stretch denotes simultaneous stretching along and transverse (diametral expansion) to the bottle long axis, axial denotes stretching along the bottle long axis, and hoop denotes stretching transverse to the bottle long axis.]

Example 2. Experimental Validation and Further Examples for PEF Co-Polyester Resins In order to further examine this concept for PEF copolyester resins, four unique 13 g preforms were designed to achieve areal stretch ratios (areal stretch ratio=axial stretch ratio×hoop stretch ratio) ranging from 11 to 29 across three straight wall bottle designs, ranging in size from 10 oz. to 16 oz. Table 3 provides a summary of selected relevant preform and bottle dimensions.

Preform Injection Molding Procedure.

The PEF resin was dried a minimum of 48 hours at 140° C. under vacuum. Each preform tooling was installed on an Arburg 420 injection molding machine with a valve-gated hot runner end cap and a 35 mm general purpose screw configuration. The injection molding conditions were optimized to produce acceptable preforms with minimum molded-in stresses and no visual defects at the minimum melt temperature.

Reheat Injection Molding Procedure.

All bottles were blown on a Sidel SB01 lab reheat stretch blow molding machine. The blow molding conditions developed using the methodology presented in this disclosure are provided in the table below and were used to produce bottles for further analysis. Bottles were produced from all preform and bottle combinations with the exception of the highest stretch ratio preform and bottle combination. Using preform design 3, PET control bottles were produced with each bottle mold.

TABLE 3

Experiment plan for PEF preform design evaluation with summary of selected preforms and stretch blow-molding bottles.

| Run Number | PTI Preform Drawing | Straight Land (mm) | Transition Section Length (mm) | Body Length (mm) | Body Thickness (mm) | End Cap Body Inside Diameter (mm) | Endcap Tip Thickness (mm) | Preform IV (dL/g) |
|---|---|---|---|---|---|---|---|---|
| 1 | CT10032-1 | 3.00 | 7.00 | 20.73 | 3.24 | 14.82 | 2.43 | 0.833 |
| 2 | | | | | | | | |
| 3 | | | | | | | | |
| 4 | CT10029-1 | 3.00 | 7.00 | 35.79 | 2.35 | 14.76 | 1.76 | 0.815 |
| 5 | | | | | | | | |
| 6 | | | | | | | | |
| 7 | CT10031-1 | 3.00 | 7.00 | 33.47 | 3.05 | 11.12 | 2.29 | 0.800 |
| 8 | | | | | | | | |
| 9 | | | | | | | | |
| 10 | CT10030-1 | 3.00 | 7.00 | 30.72 | 3.68 | 8.92 | 2.76 | 0.809 |
| 11 | | | | | | | | |
| 12 | | | | | | | | |
| PET Control-A | CT10029-1 | 3.00 | 7.00 | 35.79 | 2.35 | 14.76 | 1.76 | 0.833 |
| PET Control-B | | | | | | | | |
| PET Control-C | | | | | | | | |

| Run Number | PTI Bottle Drawing | Neck Height (mm) | Label Panel Height (mm) | Base Height (mm) | Bottle Volume (oz) | Axial Stretch Ratio | Inside Hoop Stretch Ratio | Bottle Areal Stretch Ratio |
|---|---|---|---|---|---|---|---|---|
| 1 | PT-1678 | 45.09 | 74.50 | 21.01 | 10 | 3.55 | 4.00 | 14.20 |
| 2 | PT-1679 | 44.78 | 96.01 | 21.07 | 12 | 4.00 | 4.00 | 16.00 |
| 3 | PT-2866 | 45.01 | 80.24 | 25.40 | 16 | 3.95 | 4.89 | 19.32 |
| 4 | PT-1678 | 45.09 | 74.50 | 21.01 | 10 | 2.75 | 4.00 | 11.00 |
| 5 | PT-1679 | 44.78 | 96.01 | 21.07 | 12 | 3.10 | 4.00 | 12.40 |
| 6 | PT-2866 | 45.01 | 80.24 | 25.40 | 16 | 3.06 | 4.89 | 14.96 |

TABLE 3-continued

Experiment plan for PEF preform design evaluation with summary of selected preforms and stretch blow-molding bottles.

|   | | | | | | | | |
|---|---|---|---|---|---|---|---|---|
| 7 | PT-1678 | 45.09 | 74.50 | 21.01 | 10 | 2.93 | 5.30 | 15.53 |
| 8 | PT-1679 | 44.78 | 96.01 | 21.07 | 12 | 3.30 | 5.30 | 17.49 |
| 9 | PT-2866 | 45.01 | 80.24 | 25.40 | 16 | 3.26 | 6.48 | 21.12 |
| 10 | PT-1678 | 45.09 | 74.50 | 21.01 | 10 | 3.11 | 6.60 | 20.53 |
| 11 | PT-1679 | 44.78 | 96.01 | 21.07 | 12 | 3.50 | 6.60 | 23.10 |
| 12 | PT-2866 | 45.01 | 80.24 | 25.40 | 16 | 3.45 | 8.07 | 27.84 |
| PET Control-A | PT-1679 | 45.09 | 74.50 | 21.01 | 12 | 2.75 | 4.00 | 11.00 |
| PET Control-B | PT-1678 | 44.78 | 96.01 | 21.07 | 10 | 3.10 | 4.00 | 12.40 |
| PET Control-C | PT-2866 | 45.01 | 80.24 | 25.40 | 16 | 3.06 | 4.89 | 14.96 |

TABLE 4

Volumetric creep and shelf life data at 22° C., 100% RH (relative humidity) and 38° C., 85% RH.

| Run Number | PTI Preform Drawing | PTI Bottle Drawing | Axial Stretch Ratio | Inside Hoop Stretch Ratio | Bottle Areal Stretch Ratio | Preform IV (dL/g) | Shelf Life (wks @ 22° C., 100% RH) | Initial Volumetric Creep Strain (% @ 22° C., 100% RH) | Shelf Life (wks @ 38° C., 85% RH) | Initial Volumetric Creep Strain (% @ 38° C., 85% RH) |
|---|---|---|---|---|---|---|---|---|---|---|
| 1 | CT 10032-1 | PT-1678 | 3.55 | 4.00 | 14.20 | 0.833 | 43.4 | 4.06 | 6.4 | 9.9 |
| 2 | | PT-1679 | 4.00 | 4.00 | 16.00 | | 37.3 | 9.34 | 3.9 | 10.3 |
| 3 | | PT-2866 | 3.95 | 4.89 | 19.32 | | — | — | — | — |
| 4 | CT 10029-1 | PT-1678 | 2.75 | 4.00 | 11.00 | 0.815 | 28.0 | 6.28 | — | — |
| 5 | | PT-1679 | 3.10 | 4.00 | 12.40 | | 32.6 | 8.26 | 4.1 | 18.9 |
| 6 | | PT-2866 | 3.06 | 4.89 | 14.96 | | — | — | — | — |
| 7 | CT 10031-1 | PT-1678 | 2.93 | 5.30 | 15.53 | 0.800 | 36.8 | 6.16 | — | — |
| 8 | | PT-1679 | 3.30 | 5.30 | 17.49 | | 37.4 | 6.06 | 4.1 | 16.2 |
| 9 | | PT-2866 | 3.26 | 6.48 | 21.12 | | 35.1 | 8.28 | — | — |
| 10 | CT10030-1 | PT-1678 | 3.11 | 6.60 | 20.53 | 0.809 | 41.5 | 4.24 | 6.4 | 12.0 |
| 11 | | PT-1679 | 3.50 | 6.60 | 23.10 | | 27.3 | 8.02 | — | — |
| 12 | | PT-2866 | 3.45 | 8.07 | 27.84 | | — | — | — | — |
| PET Control-A | CT10029-1 | PT-1679 | 2.75 | 4.00 | 11.00 | 0.833 | 7.0 | 6.28 | 1.9 | 9.3 |
| PET Control-B | | PT-1678 | 3.10 | 4.00 | 12.40 | | 7.6 | 4.36 | 3.2 | 9.3 |
| PET Control-C | | PT-2866 | 3.06 | 4.89 | 14.96 | | 6.5 | 9.63 | — | — |

Example 3. Analytical Testing of Fabricated Bottles

The resulting test bottles prepared according to Example 3 were submitted to an analytical laboratory for transient testing of bottle material distribution, volumetric creep, and shelf life. Preform and bottle dimensions, measured perform intrinsic viscosities, and results for creep testing and carbonated beverage shelf life for the produced bottles at 22° C. and 38° C. are summarized in Table 4.

Useful ranges were discovered for this polymer using the methodology described herein for the axial and inside hoop stretch ratios for unmodified PEF resins in the range of intrinsic viscosities between 0.65 and 1.00 dL/g. Based upon the results for volumetric creep and shelf life, particularly useful stretch ratio ranges were found to be bifurcated for the PEF bottles considered in this study. The elliptical domains were conveniently defined for what is generally referred to herein as various stretch ratio domains, with Domain 1 being the broadest, and narrowing to Domain 3 and Domain 4, which are both fairly narrow ranges, with Domain 3 being specific to high hoop stretch and Domain 4 being specific to low loop stretch. These ranges are set out below and are graphically presented in FIG. 2 and FIG. 3.

Stretch Ratio Domain 1:
Axial ratio coordinate (abscissa) offset: 3.35
Inside hoop ratio coordinate (ordinate) offset: 5.45
Major axis radius: 2.75
Minor axis radius: 1.25
Major axis rotation relative to axial stretch ratio abscissa: −75° (−1.31 radians)

Stretch Ratio Domain 2:
Axial ratio coordinate (abscissa) offset: 3.20
Inside hoop ratio coordinate (ordinate) offset: 5.35
Major axis radius: 2.30
Minor axis radius: 1.00
Major axis rotation relative to axial stretch ratio abscissa: −75° (−1.31 radians)

Stretch Ratio Domain 3 for High Hoop Stretch:
Axial ratio coordinate (abscissa) offset: 2.80
Inside hoop ratio coordinate (ordinate) offset: 6.20
Major axis radius: 1.00
Minor axis radius: 0.48
Major axis rotation relative to axial stretch ratio abscissa: −80° (−1.40 radians)

Stretch Ratio Domain 4 for Low Hoop Stretch:
Axial ratio coordinate (abscissa) offset: 3.55
Inside hoop ratio coordinate (ordinate) offset: 4.35
Major axis radius: 0.85
Minor axis radius: 0.47
Major axis rotation relative to axial stretch ratio abscissa: −90° (−1.57 radians)

The stretch ratio ranges disclosed herein may be used to design a range of preforms that can provide improved injection molding and reheat stretch blow molding performance and bottles with extended shelf life, as compared to PET produced using the same preforms bottle molds. Examples of the shelf life data are provided at FIG. 3. Bottles produced within the most narrow ranges of stretch ratios (Stretch Ratio Domain 3 and Stretch Ratio Domain 4) yielded comparable initial volumetric creep, but significantly higher shelf life. PEF bottles produced in the broader ranges (Stretch Ratio Domain 1 and Stretch Ratio Domain 2) yielded higher volumetric creep strains than the corresponding PET bottles, but the shelf life was still over twice as high as for bottle the lowest recorded PEF shelf life.

Example 3. Selected Combinations of Inside Hoop Ratios and Axial Stretch Ratios for PEF Small Bottles Referring to FIG. 2 and FIG. 3, a graphic illustration of PEF small bottle (13.0 g) initial volumetric creep strain (22° C.) tabulated on the plot itself (FIG. 2) and shelf life (weeks at 22° C., determined by FTIR) tabulated on the plot itself (FIG. 3) that correspond to successful combinations of inside hoop ratios and axial stretch ratios for PEF small bottles are presented. The innermost ellipses correspond to more preferred high hoop (red) and low hoop (orange) embodiments. The lowest volumetric creep and the highest FTIR shelf life at 22° C. was derived for PEF using the equibiaxial preform design with a 4.00×4.00=16.0 (axial stretch ratio×hoop stretch ratio=areal stretch ratio) and the 10 oz. bottle mold. All of the PEF bottles regardless of size (namely, 10, 12, or 16 oz.), reheat stretch blow molded from the same preform design, exhibited similar deformation modes distributed across the neck, body sidewall and base of all bottles as did the 10 oz. PET bottle. No significant transition in deformation modes was noted for the PEF 16 oz. bottle as was for the similarly sized PET bottle.

As a result of this study, the following table correlates to the data in FIG. 2 and FIG. 3, wherein "blue" corresponds to the data within the blue ellipse which may be referred to as preferred aspects, "green" corresponds to the data within the green ellipse which may be referred to as more preferred aspects, "red" corresponds to the data within the red ellipse which may be referred to as most preferred aspects for high hoop stretch ratio, and "orange" corresponds to the data within the orange ellipse which may be referred to as most preferred aspects for high hoop stretch ratio. These approximate minimum and maximum ratios are tabulated in the following table.

TABLE 5

Minimum and maximum stretch ratios obtained using the methodology according to this disclosure.

| Color | Axial Stretch Ratio (preform) | | Hoop Stretch Ratio (preform) | | Overall Stretch Ratio (container) | |
|---|---|---|---|---|---|---|
| | Min | Max | Min | Max | Min | Max |
| Blue | 1.949 | 4.751 | 2.774 | 8.126 | 5.407 | 38.607 |
| Green | 2.065 | 4.331 | 3.113 | 7.587 | 6.428 | 32.859 |
| Red | 2.302 | 3.298 | 5.217 | 7.118 | 12.010 | 23.475 |
| Orange | 3.081 | 4.016 | 3.502 | 5.200 | 10.790 | 20.883 |

The disclosures of various publications may be referenced throughout this specification, which are hereby incorporated by reference in pertinent part in order to more fully describe the state of the art to which the disclosed subject matter pertains. To the extent that any definition or usage provided by any document incorporated herein by reference conflicts with the definition or usage provided herein, the definition or usage provided herein controls.

Throughout the specification and claims, the word "comprise" and variations of the word, such as "comprising" and "comprises," means "including but not limited to," and is not intended to exclude, for example, other additives, components, elements, or steps. While methods and features are described in terms of "comprising" various steps or components, these methods and features can also "consist essentially of" or "consist of" the various steps or components.

Unless indicated otherwise, when a range of any type is disclosed or claimed, for example a range of the percentages, WDEs, diameters, weights, and the like, it is intended to disclose or claim individually each possible number that such a range could reasonably encompass, including any sub-ranges or combinations of sub-ranges encompassed therein. When describing a range of measurements such as these, every possible number that such a range could reasonably encompass can, for example, refer to values within the range with one significant figure more than is present in the end points of a range, or refer to values within the range with the same number of significant figures as the end point with the most significant figures, as the context indicates or permits. For example, when describing a range of percentages such as from 85% to 95%, it is understood that this disclosure is intended to encompass each of 85%, 86%, 87%, 88%, 89%, 90%, 91%, 92%, 93%, 94%, and 95%, as well as any ranges, sub-ranges, and combinations of sub-ranges encompassed therein. Applicants' intent is that these two methods of describing the range are interchangeable. Accordingly, Applicants reserve the right to proviso out or exclude any individual members of any such group, including any sub-ranges or combinations of sub-ranges within the group, if for any reason Applicants choose to claim less than the full measure of the disclosure, for example, to account for a reference that Applicants are unaware of at the time of the filing of the application.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed herein, and that each value is also herein disclosed as "about" that particular value in addition to the value itself. In aspects, "about" can be used to mean within 10% of the recited value, within 5% of the recited value, or within 2% of the recited value.

In any application before the United States Patent and Trademark Office, the Abstract of this application is provided for the purpose of satisfying the requirements of 37 C.F.R. § 1.72 and the purpose stated in 37 C.F.R. § 1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that are employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

Those skilled in the art will readily appreciate that many modifications are possible in the exemplary embodiments disclosed herein without materially departing from the novel teachings and advantages according to this disclosure. Accordingly, all such modifications and equivalents are intended to be included within the scope of this disclosure as defined in the following claims. Therefore, it is to be understood that resort can be had to various other aspects, embodiments, modifications, and equivalents thereof which, after reading the description herein, may suggest themselves to one of ordinary skill in the art without departing from the spirit of the present disclosure or the scope of the appended claims.

Applicants reserve the right to proviso out any selection, feature, range, element, or aspect, for example, to limit the scope of any claim to account for a prior disclosure of which Applicants may be unaware.

We claim:

1. A method of fabricating a polymer container having reduced residual stress, the method comprising:
   a) providing a preform for a polymer container;
   b) measuring the photoelasticity (stress-induced birefringence) of at least one selected section of the preform using circularly polarized light to determine residual stress patterns in the preform;
   c) using the residual stress patterns in the preform to determine an axial stretch ratio and a hoop stretch ratio for stretch blow-molding the preform which reduce residual stress in the polymer container;
   d) stretch blow-molding the preform to form the polymer container using the determined axial stretch ratio and a hoop stretch ratio;
   e) measuring the photoelasticity (stress-induced birefringence) of at least one selected section of the polymer container using circularly polarized light to determine residual stress patterns in the polymer container; and
   f) using the residual stress patterns in the polymer container to adjust preform dimensions for a size-adjusted perform, further reducing residual stress in the size-adjusted perform compared to the preform of step a).

2. A method of fabricating a polymer container according to claim 1, wherein the photoelasticity measurement comprises a polariscopic method based upon a ten-step phase shift employing a circular polarizer and a specimen with a curved surface to determine residual stress patterns.

3. A method of fabricating a polymer container according to claim 1, wherein the photoelasticity measurement comprises a curved surface, wherein the surface curvature to the specimen thickness ratio is greater than about 3.

4. A method of fabricating a polymer container according to claim 1, wherein the residual stress patterns include principal stress differences (isochromatics) and principal stress directions (isoclinics).

5. A method of fabricating a polymer container according to claim 1, wherein the polymer container comprises a polyethylene terephthalate (PET) polymer or co-polymer, or a poly(ethylene-2,5-furandicarboxylate) (PEF) polymer or co-polymer.

6. A method of fabricating a polymer container according to claim 1, wherein the container thickness is less than or about 0.50 inches thick.

7. A method of fabricating a polymer container according to claim 1, wherein the container side-wall thickness is less than or about 0.25 inches.

8. A method of fabricating a polymer container according to claim 1, wherein the preform and polymer container comprise a poly(ethylene-2,5-furandicarboxylate) (PEF) polymer or co-polymer, and the axial stretch ratio is from about 1.9 to about 4.7 and the hoop stretch ratio is from about 2.7 to about 8.1.

9. A method of fabricating a polymer container according to claim 1, wherein the preform and polymer container comprise from about 5% to about 10% by weight PEF and from about 90% to about 95% by weight PET.

10. A method of fabricating a polymer container according to claim 1, wherein the preform weighs at least about 13 grams.

11. A method of fabricating a polymer container according to claim 1, wherein the axial stretch ratio is from about 2.0 to about 4.3 and the hoop stretch ratio is from about 3.1 to about 7.5.

12. A method of fabricating a polymer container according to claim 1, wherein the axial stretch ratio is from about 2.3 to about 3.2 and the hoop stretch ratio is from about 5.2 to about 7.1.

13. A method of fabricating a polymer container according to claim 1, wherein the axial stretch ratio is from about 3.0 to about 4.0 and the hoop stretch ratio is from about 5.2 to about 3.5.

14. A method of fabricating a polymer container according to claim 1, wherein the areal stretch ratio (axial stretch ratio×hoop stretch ratio) is from about 6 to about 33.

15. A method of fabricating a polymer container according to claim 1, wherein the areal stretch ratio (axial stretch ratio×hoop stretch ratio) is from about 12 to about 24.

16. A method of fabricating a polymer container according to claim 1, wherein the areal stretch ratio (axial stretch ratio×hoop stretch ratio) is from about 16 to about 21.

17. A method of fabricating a polymer container according to claim 1, further comprising the step of:
   g) repeating steps a)-d) to form an improved polymer container which further reduces residual stress in the improved polymer container compared to the polymer container of step d).

* * * * *